US010232600B2

(12) United States Patent
Wang et al.

(10) Patent No.: US 10,232,600 B2
(45) Date of Patent: Mar. 19, 2019

(54) FILM PEELING MACHINE MOVEMENT ASSEMBLY

(71) Applicant: BOE TECHNOLOGY GROUP CO., LTD., Beijing (CN)

(72) Inventors: Linlin Wang, Beijing (CN); Xuequan Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 15/521,233

(22) PCT Filed: Jul. 18, 2016

(86) PCT No.: PCT/CN2016/090292
§ 371 (c)(1),
(2) Date: Apr. 21, 2017

(87) PCT Pub. No.: WO2017/117967
PCT Pub. Date: Jul. 13, 2017

(65) Prior Publication Data
US 2018/0086042 A1    Mar. 29, 2018

(30) Foreign Application Priority Data
Jan. 5, 2016   (CN) .......................... 2016 1 0005206

(51) Int. Cl.
B32B 43/00    (2006.01)
B32B 38/10    (2006.01)
(Continued)

(52) U.S. Cl.
CPC ............ *B32B 38/10* (2013.01); *B32B 43/006* (2013.01); *B65B 33/00* (2013.01); *B65B 69/00* (2013.01);
(Continued)

(58) Field of Classification Search
CPC ........ Y10T 156/1168; Y10T 156/1978; F16M 11/12; B32B 43/006
(Continued)

(56) References Cited

U.S. PATENT DOCUMENTS 3,197,162 A * 7/1965 Johanson ............ B27B 17/0016
248/646
5,040,431 A * 8/1991 Sakino ................. F16C 29/025
108/143

(Continued)

FOREIGN PATENT DOCUMENTS

CN    102896876 A    1/2013
CN    103465603 A    12/2013
(Continued)

OTHER PUBLICATIONS

Second Chinese Office Action, for Chinese Patent Application No. 201610005206.2, dated Sep. 12, 2017, 9 pages.
(Continued)

Primary Examiner — Mark A Osele
(74) Attorney, Agent, or Firm — Kinney & Lange, P.A.

(57) ABSTRACT

A film peeling machine movement assembly is disclosed in the embodiments of the disclosure, including: a film peeling machine provided with a frame having a first portion and a second portion; a first engaging component connected with one of the first portion and the second portion of the frame; and a first moving device provided with a first moving component and a first side engaging component connected with the first moving component for engagement with the first engaging component for moving the film peeling machine along a first path by the first moving component. The film peeling machine movement assembly of the embodiments of the disclosure is applied, so as to grasp and to move the film peeling machine automatically such that the film peeling machine is moved into and out of a replacement
(Continued)

chamber and moved into an operational position automatically.

17 Claims, 10 Drawing Sheets

(51) Int. Cl.
  *B65B 33/00* (2006.01)
  *B65B 69/00* (2006.01)
  *F16M 11/12* (2006.01)
(52) U.S. Cl.
  CPC ......... *F16M 11/12* (2013.01); *Y10T 156/1168* (2015.01); *Y10T 156/1978* (2015.01)
(58) Field of Classification Search
  USPC ........................................ 248/646, 660, 661
  See application file for complete search history.

(56) References Cited

U.S. PATENT DOCUMENTS

| | | | | |
|---|---|---|---|---|
| 5,760,564 | A * | 6/1998 | Novak | B23Q 3/00 269/55 |
| 6,327,929 | B1 * | 12/2001 | Yanagisawa | B23Q 1/017 108/143 |
| 6,677,691 | B2 * | 1/2004 | Ebihara | B23Q 1/621 310/12.06 |
| 8,231,045 | B2 * | 7/2012 | Lagerkvist | B23K 37/0229 219/124.1 |
| 9,205,600 | B1 * | 12/2015 | Kerr | B29C 64/20 |
| 2008/0245483 | A1 * | 10/2008 | Toyoshima | B32B 43/006 156/763 |
| 2015/0290825 | A1 * | 10/2015 | Posarelli | B26D 1/045 83/870 |

FOREIGN PATENT DOCUMENTS

| | | |
|---|---|---|
| CN | 103466151 A | 12/2013 |
| CN | 104503111 A | 4/2015 |
| CN | 104816976 A | 8/2015 |
| CN | 204674160 U | 9/2015 |
| CN | 105538881 A | 5/2016 |
| EP | 2322435 A2 | 5/2011 |
| JP | 2009239071 A | 10/2009 |
| JP | 2015101473 A | 6/2015 |
| TW | 200916375 A | 4/2009 |

OTHER PUBLICATIONS

International Search Report and Written Opinion (including English translation of Box V) dated Oct. 12, 2017, for corresponding PCT Application No. PCT/CN2016090292.
First Chinese Office Action dated Mar. 22, 2017 for corresponding Chinese Application No. 201610005206.2.

* cited by examiner

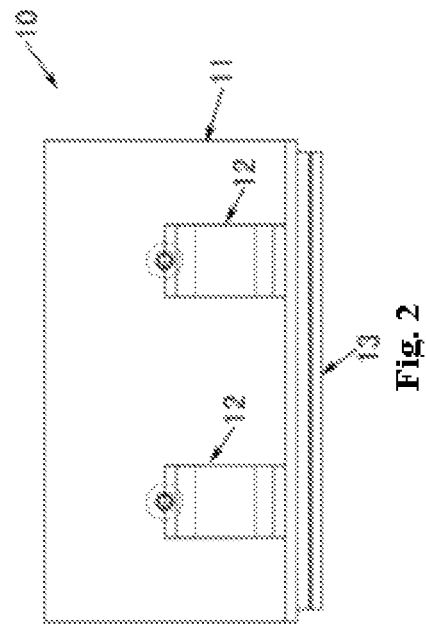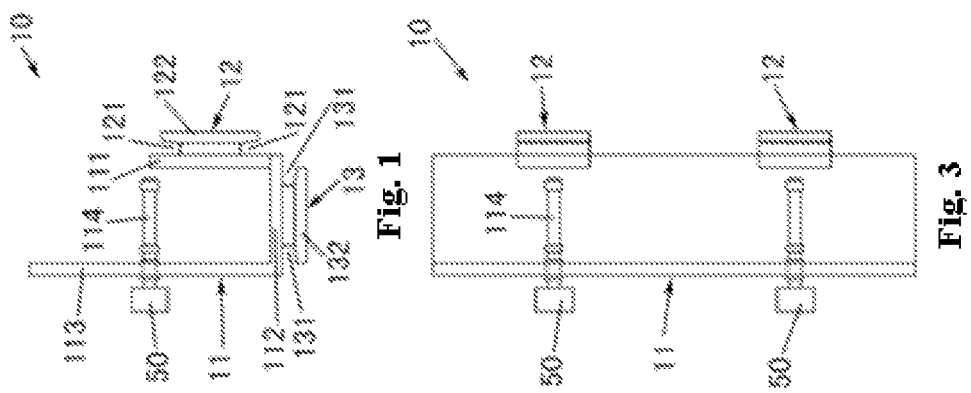

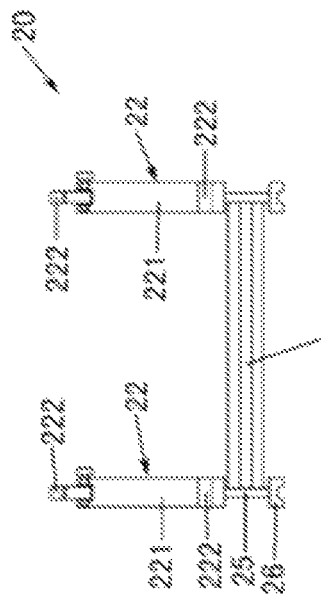
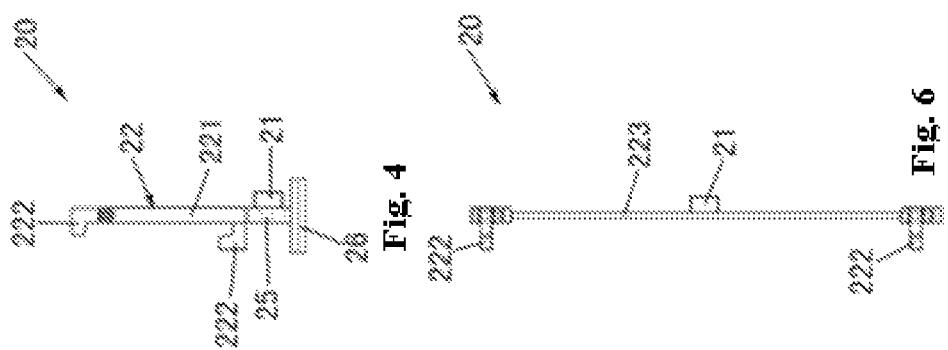

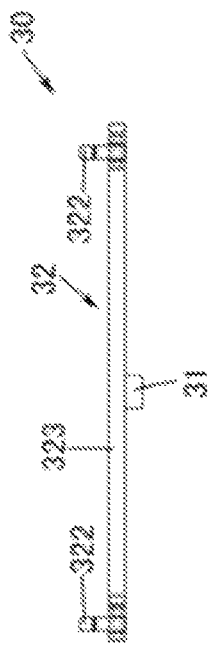
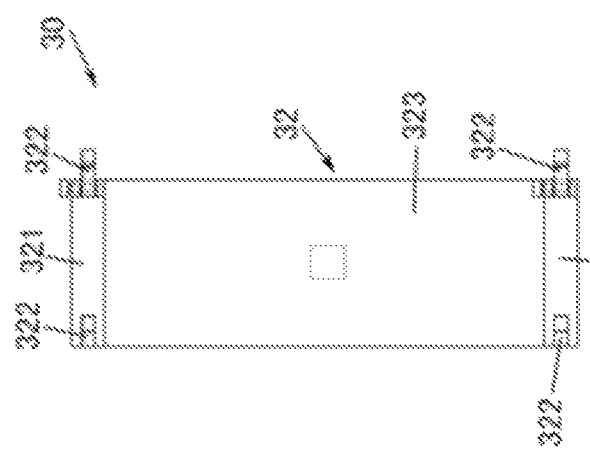

FILM PEELING MACHINE MOVEMENT ASSEMBLY

CROSS-REFERENCE TO RELATED INVENTION

The present invention claims the benefit of Chinese Patent Invention No. 201610005206.2 filed on Jan. 5, 2016 in the State Intellectual Property Office of China, the whole disclosure of which is incorporated herein by reference.

BACKGROUND OF THE INVENTION

Field of the Invention

Embodiments of the present disclosure relate to the technical field of mechanical equipment, and in particular, to a film peeling machine movement assembly which facilitates movement of a film peeling machine for peeling off surface film material from a surface of a product.

Description of the Related Art

During production and manufacturing processes, before processing, many products (e.g., optical film material) may have a protective film or protective films attached onto a surface thereof, so as to avoid any damage thereof or any quality problem caused by in-falling particles or dust entrained in air of working environment. Therefore, during processing and assembly of products, subsequent treatment is required to be carried out only in a case of the removal of the protective film(s). Nowadays, an automatic film peeling machine makes its way into practical use in the art. However, the replacement of a bearing disk for a film peeling tape within the film peeling machine is performed manually at present, during which the film peeling machine is required to be moved into a replacement chamber, followed by removal of the film peeling machine therefrom once such replacement is completed.

Therefore, it is necessary to provide a film peeling machine for solving above problems.

SUMMARY OF THE INVENTION

The embodiments of the present disclosure have been made to overcome or alleviate at least one aspect of the above mentioned disadvantages and/or shortcomings in the prior art. A film peeling machine movement assembly is intended to be provided in the exemplary embodiments of the present disclosure, such that an automatic movement of the film peeling machine may be achieved.

Following technical solutions are adopted for providing the above desired products.

According to an aspect of the exemplary embodiment of the present disclosure, there is provided a film peeling machine movement assembly, comprising: a film peeling machine provided with a frame having a first portion and a second portion; a first engaging component connected with one of the first portion and the second portion of the frame; and a first moving device provided with a first moving component and a first side engaging component connected with the first moving component for engagement with the first engaging component for moving the film peeling machine along a first path by the first moving component.

By the film peeling machine movement assembly according to the embodiments of the disclosure, by way of example, the film peeling machine may be grasped and moved automatically such that the film peeling machine is moved into and out of a replacement chamber and moved into an operational position automatically.

BRIEF DESCRIPTION OF THE DRAWINGS

The above and other features and advantages of the present invention will become more apparent and a more comprehensive understanding of the present invention can be obtained, by describing in detail exemplary embodiments thereof with reference to the accompanying drawings, in which:

FIG. 1 illustrates a front elevation view of a film peeling machine according to one exemplary embodiment of the disclosure;

FIG. 2 illustrates a left elevation view of the film peeling machine according to one exemplary embodiment of the disclosure;

FIG. 3 illustrates a top view of the film peeling machine according to one exemplary embodiment of the disclosure;

FIG. 4 illustrates a front elevation view of a first moving device according to one exemplary embodiment of the disclosure;

FIG. 5 illustrates a left elevation view of the first moving device according to one exemplary embodiment of the disclosure;

FIG. 6 illustrates a top view of the first moving device according to one exemplary embodiment of the disclosure;

FIG. 7 illustrates a front elevation view of a second moving device according to one exemplary embodiment of the disclosure;

FIG. 8 illustrates a left elevation view of the second moving device according to one exemplary embodiment of the disclosure;

FIG. 9 illustrates a top view of the second moving device according to one exemplary embodiment of the disclosure;

DETAILED DESCRIPTION OF PREFERRED EMBODIMENTS OF THE INVENTION

Figure 11:
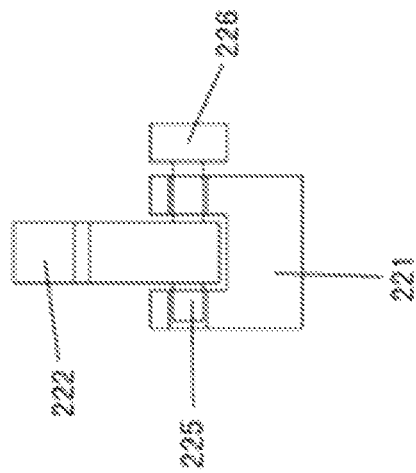
FIG. 11 illustrates a left elevation view of the jaw according to one exemplary embodiment of the disclosure.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the invention in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of the film peeling machine and the film peeling machine movement assembly.

According to a general technical concept of the present invention, there is provided a film peeling machine movement assembly. By way of example, as illustrated in FIGS. 1-18, in particular to FIGS. 1-6, a film peeling machine movement assembly 100 according to an exemplary embodiment of the disclosure comprises: a film peeling machine 10 provided with a frame 11 having a first portion 111 and a second portion 112; first engaging components 12 connected with one of the first portion 111 and the second portion 112 of the frame (e.g., the first portion 111 in the illustrated exemplary embodiment); and a first moving device 20 provided with a first moving component 21 and first side engaging components 22 connected with the first moving component 21 for engagement with corresponding one of the first engaging components 12 for moving the film peeling machine 10 along a first path D1 by the first moving component 21. The film peeling machine movement assembly 100 of the embodiments of the disclosure is applied, e.g., so as to grasp and to move the film peeling machine 10 automatically such that the film peeling machine 10 is moved into and out of a replacement chamber 4 automatically and moved into an operational position.

In particular, according to an exemplary embodiment of the disclosure, as illustrated in FIGS. 4-6 and FIGS. 13-18, two first side engaging components 22 are connected by a connector 223, and the first moving device 21 comprises certain component(s), e.g., a hydraulic cylinder and the like and connects with the connector 223 so as to move the first side engaging components 22, e.g., by pulling or pushing motion. Specifically, for example, the first moving device 20 further comprises a guide 23, steering parts 26 and supports 25 each of which supports 25 connects at one end thereof with corresponding one first side engaging component 22 and connects at the other end thereof with the steering part 26; the steering part 26 may for example be a sliding block while the guide 24 may for example be a sliding rail correspondingly which is in sliding fit with the steering part 26 so as to guide the movement of the first engaging component 12. As illustrated in FIGS. 4 and 5, by way of example, the support 25 is located at a bottom portion of the first moving device 20 and attached onto the steering part 26 so as to support the first moving device 20 movably on the guide 23 which fits with the steering part 26. The connector 223 connects with two supports 25. As illustrated, the first moving device 20 is for example used to move the film peeling machine in a horizontal direction. Correspondingly, by way of example, the first path D1 is arranged in a horizontal moving direction.

Figure 13:
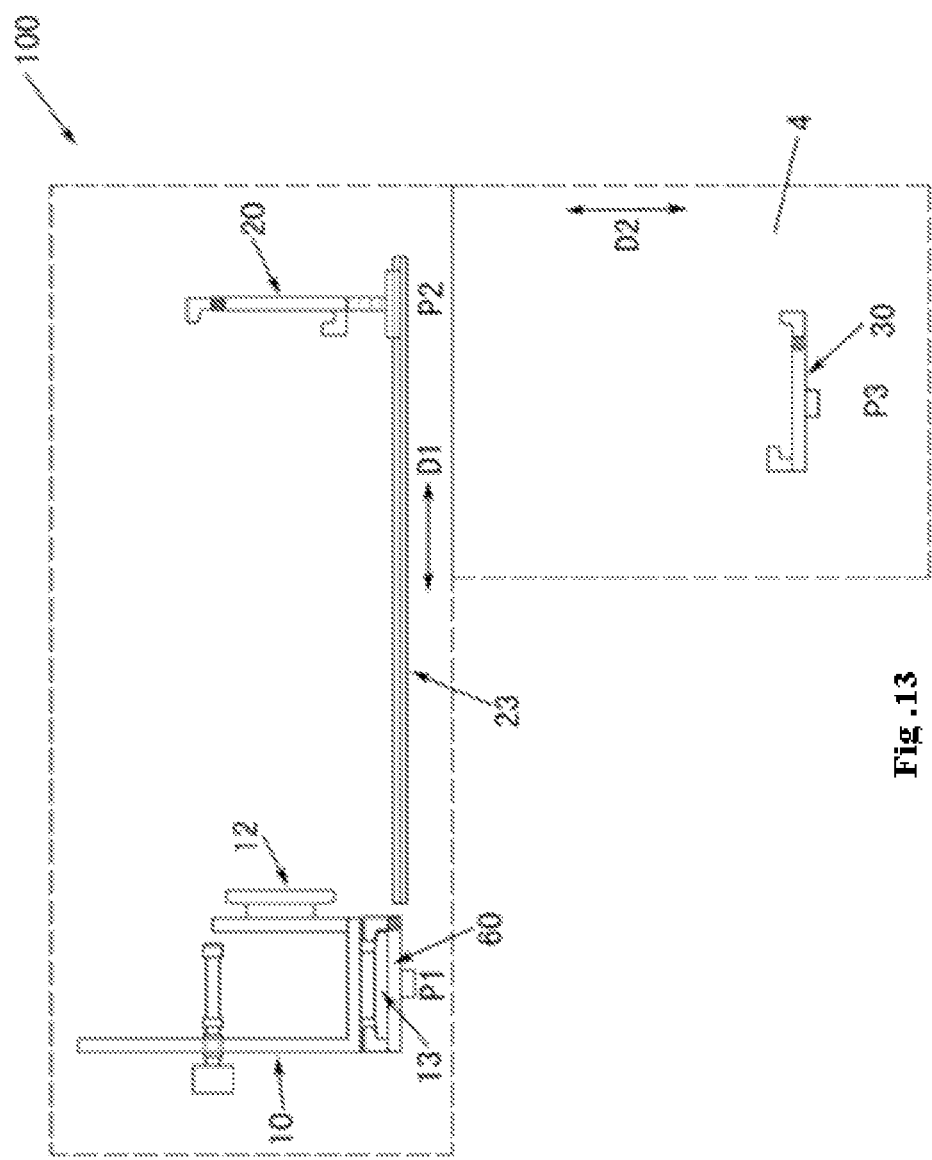
FIG. 13 illustrates a schematic view of the film peeling machine being located at a first position according to one exemplary embodiment of the disclosure.

In some exemplary embodiments of the disclosure, specifically as illustrated in FIGS. 1-3, FIGS. 7-9, by way of example, the film peeling machine moving assembly 100 further comprises: a second engaging component 13 connected with the other one of the first portion 111 and the second portion 112 of the frame 11 (e.g., the second portion 112 in the illustrated exemplary embodiment); and a second moving device 30 provided with a second moving component 31 and second side engaging components 32 connected with the second moving component 31 for engagement with the second engaging component 13 for moving the film peeling machine 10 along a second path D2 by the second moving component 31. As illustrated, for example, the second moving device 30 is used to move the film peeling machine in a vertical direction. Correspondingly, by way of example, the second path D2 is arranged in a vertical moving direction. The film peeling machine movement assembly 100 of the embodiments of the disclosure is applied, e.g., as illustrated in FIG. 13, by a transfer of the film peeling machine 10 between the first moving devices 20 and the second moving device 30, the film peeling machine 10 may move sequentially along two paths, such that there are sufficient degrees of freedom in a layout design of a replacement chamber 4.

As illustrated in FIGS. 7-9, two side engaging components 32 are connected by a connector 323, and the second moving device 31 comprises certain component(s), e.g., a hydraulic cylinder and the like and connects with the connector 323 so as to move the second side engaging components 32. Furthermore, for example, the second moving component 31 further comprises a guide for guiding movement of the second engaging component 13.

As illustrated in FIG. 1, the film peeling machine 10 further comprises an electric motor 50 for driving a rotation of a drive shaft 114 mounted on one side of a first side wall 113 (e.g., on inner side thereof).

Referring to FIGS. 13-18, in some exemplary embodiments of the disclosure, the first engaging component 12 is connected with a side portion of the frame 11, and the first path D1 is a path which is arranged substantially in a horizontal direction. The film peeling machine movement assembly 100 of the embodiments of the disclosure is applied, e.g., the film peeling machine movement assembly 100 is simple in its structure. Furthermore, the second engaging component 13 is connected with a bottom portion of the frame 11, and the second path D2 is a path which is arranged substantially in a vertical direction. The film peeling machine movement assembly 100 of the embodiments of the disclosure is applied, by sequential horizontal and vertical movements of the film peeling machine 10, the film peeling machine 10 may be moved to any desired position automatically.

In an exemplary embodiment of the disclosure, referring to FIGS. 1-3 and FIGS. 13-18, a first H-shaped sub-assembly is created by each first engaging component 12 and the one of the first portion and the second portion, being formed with two first grooves 121 which are arranged opposite to each other; and each of the first side engaging components 22 is provided with a first body 221 and two first jaws 222 arranged opposite to each other and connected with the first body 221, two first bodies 221 of the two first side engaging components 22 being arranged opposite to and spaced apart from each other, while both of the two first jaws 222 of each first side engaging component 22 being engageable within the two first grooves 121 respectively while at least one of the two first jaws 222 being movable. The film peeling machine movement assembly 100 of the embodiments of the disclosure is applied, and a secured and robust engagement may be achieved by engagement between the grooves and jaws so as to move the film peeling machine 10 reliably. Furthermore, a second H-shaped sub-assembly is created by the second engaging component 13 and the other one of the first portion and the second portion (or alternatively, e.g., one of an I-shaped sub-assembly or a double T-section shaped sub-assembly is formed), being formed with two second grooves 131 which are arranged opposite to each other; and each of the second side engaging components 32 is provided with a second body 321 and two second jaws 322 arranged opposite to each other and connected with the second body 321, both of the two second jaws 322 being engageable within the two second grooves 131 respectively while at least one of the two second jaws 322 being movable. The film peeling machine movement assembly 100 of the embodiments of the disclosure is applied, and a secured and robust engagement may be achieved by engagement between the grooves and jaws so as to move the film peeling machine 10 reliably, while a reliable transfer of the film peeling machine 10 between the first moving device 20 and the second moving device 30 may also be achieved simultaneously.

By way of example, according to a further exemplary embodiment of the disclosure, at least one of the two first jaws 222 is rotatable, or at least one of the two second jaws 322 is rotatable. Alternatively or additionally, for example, at least one of the two first jaws 222 is translatable, or at least one of the two second jaws 322 is translatable. Therefore, the film peeling machine movement assembly 100 of the embodiments of the disclosure is applied, an easy but reliable engagement may be achieved by the translatable jaws and/or rotatable jaws.

Figure 10:
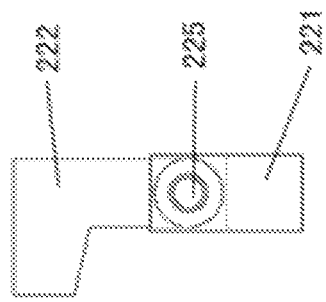
FIG. 10 illustrates a front elevation view of a jaw according to one exemplary embodiment of the disclosure.
Figure 12:
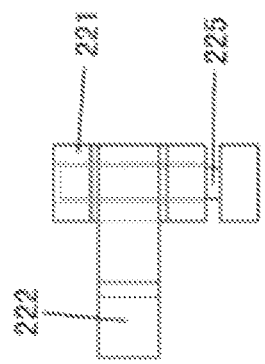
FIG. 12 illustrates a top view of the jaw according to one exemplary embodiment of the disclosure.

In an exemplary embodiment of the disclosure, referring to FIGS. 10-12, one of the first jaws 222 of each first side engaging component 22 is connected with the first body 221 by a rotation shaft 225. The first jaws 222 are substantially in a form of inverted L shape. By way of example, the other first jaw 222 of the first side engaging component 22 is fixed. As illustrated in FIGS. 7-8, and FIGS. 10-12, one of the second jaws 322 of each second side engaging component 32 is connected with the second body 321 by a rotation shaft. The second jaws 322 are substantially in a form of inverted L shape. By way of example, the other second jaw 322 of the second side engaging component 32 is fixed. For example, rotation of the jaws may be achieved by the rotation of the rotation shaft 225 driven by a drive component 226.

By way of example, the translation and rotation of the jaws may be achieved by drive components such as electric motor and hydraulic cylinder and so on. For example, an electric motor and a worm reducer may be chosen to implement rotation of the jaws, while translation of the jaws may be carried out by a hydraulic cylinder.

In an exemplary embodiment of the disclosure, referring to FIGS. 13-18, the first moving device 20 is configured to move the film peeling machine 10 between a first position P1 and a second position P2 by an engagement between the first side engaging components 22 and the first engaging components 12 and by an actuation action of the first moving component 21. The film peeling machine movement assembly 100 of the embodiments of the disclosure is applied, e.g., the film peeling machine 10 may be moved automatically in a substantially horizontal direction between the first position P1 and the second position P2.

In an exemplary embodiment of the disclosure, referring to FIGS. 13-18, apart from the first moving device 20, the second moving device 30 is also configured to move the film peeling machine 10 between the second position P2 and the third position P3 in a substantially vertical direction by an engagement between the second side engaging components 32 and the second engaging component 13 and by an actuation action of the second moving component 31. The film peeling machine movement assembly 100 of the embodiments of the disclosure is applied, e.g., the film peeling machine 10 may be moved automatically among the first position P1, the second position P2 and the third position P3.

In an exemplary embodiment of the disclosure, referring to FIGS. 13-18, the first moving device 20 and the second moving device 30 are configured that, at the second position P2, the second side engaging components 32 and the second engaging component 13 are engaged in a condition that the first side engaging components 22 and the first engaging components 12 are engaged, and the first side engaging components 22 and the first engaging components 12 are engaged in a condition that the second side engaging components 32 and the second engaging component 13 are engaged, so as to transfer the film peeling machine 10 between the first moving device 20 and the second moving device 30. The film peeling machine movement assembly 100 of the embodiments of the disclosure is applied, such that the film peeling machine 10 is transferred reliably between the first moving device 20 and the second moving device 30.

By way of example, as illustrated in FIG. 1, each first engaging component 12 comprises a first T-shaped piece 122 which creates the first H-shaped sub-assembly with the one of the first portion 111 and the second portion 112 (e.g., the first portion 111 as in the illustrated embodiment); and the second engaging component 13 comprises a second T-shaped piece 132 which creates the second H-shaped sub-assembly with the other one of the first portion 111 and the second portion 112 (e.g., the second portion 112 as in the illustrated embodiment). The film peeling machine movement assembly 100 of the embodiments of the disclosure is applied, and the grooves are formed by the T-shaped pieces such that the engaging components are simple in its structure and facilitate engagement thereof.

By way of example, as illustrated in FIGS. 1-3, especially as illustrated in the top view of the FIG. 3, the two first grooves 121 extend substantially horizontally in a lengthwise direction of the frame 11 and are disposed substantially within a vertical plane respectively; and the two second grooves 131 extend substantially horizontally in a direction transverse to the lengthwise direction of the frame 11 and are disposed substantially within a horizontal plane respectively. The film peeling machine movement assembly 100 of the embodiments of the disclosure is applied, and grooves arranged in certain directions are adopted so as to ensure convenience of engagement.

By way of example, as illustrated in FIG. 1, the first portion 111 and the second portion 112 are a bottom portion and a side portion of the frame respectively. The film peeling machine movement assembly 100 of the embodiments of the disclosure is applied, and engaging components are formed at both the bottom portion and the side portion thereof such that an automatic movement of the film peeling machine 10 may be implemented without large modification/variation of the structure of the film peeling machine 10.

By way of example, as illustrated in FIGS. 1-3, the frame 11 comprises: a bottom wall defining the bottom portion; a first side wall 113 extending upwards from one side of the bottom wall, onto which first side wall a bearing disk for a film peeling tape is mounted via a drive shaft 114; and a second side wall extending upwards from the other side of the bottom wall and arranged opposite to the first side and defining the side portion. The film peeling machine movement assembly 100 of the embodiments of the disclosure is applied, and set positions of the engaging components may be provided by a simple structure.

In an exemplary embodiment of the disclosure, as illustrated in FIGS. 1-3, a height of the second engaging component 13 is lower than that of the bearing disk for the film peeling tape so as to avoid occurrence of interference during a normal operation. For example, the height of the second engaging component 13 is chosen specifically to be lower than that of the drive shaft 114.

Figure 14:
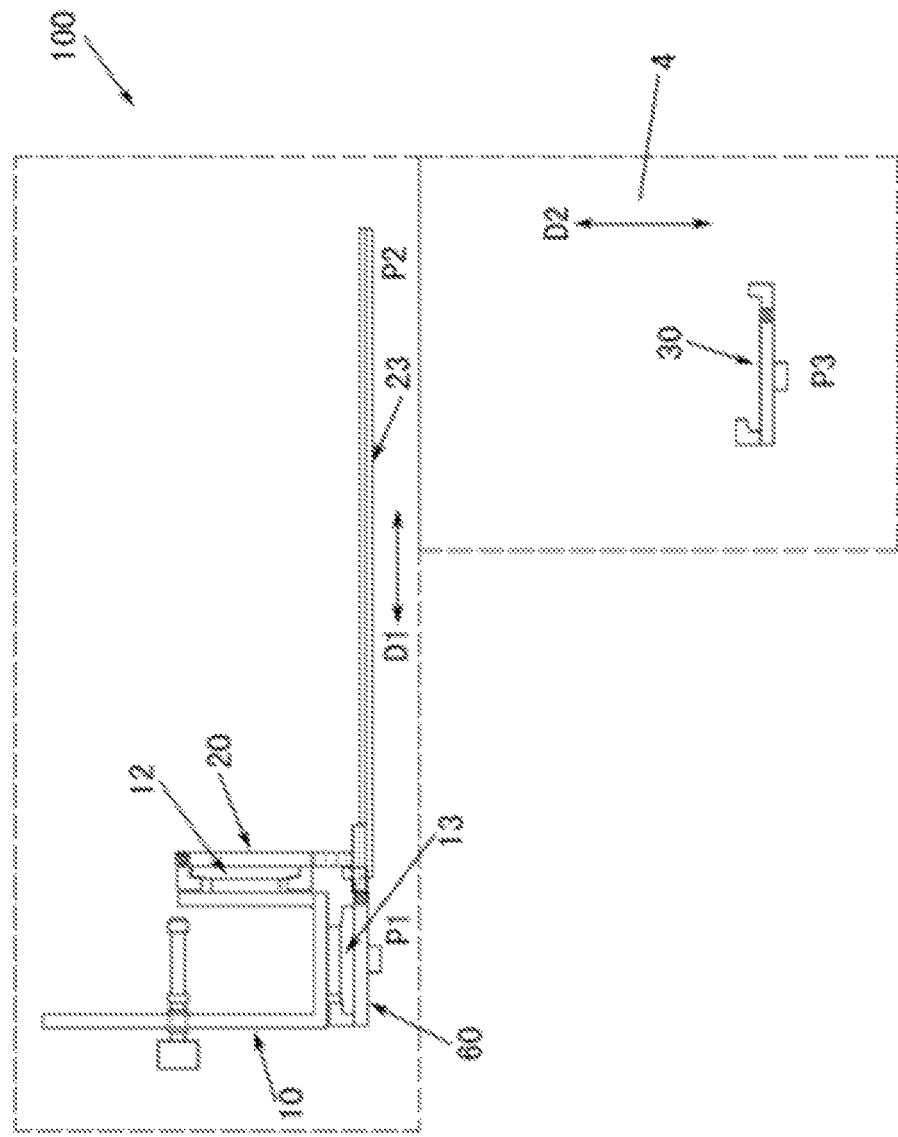
FIG. 14 illustrates a schematic view of the film peeling machine being transferred to the first moving device at the first position according to one exemplary embodiment of the disclosure.
Figure 15:
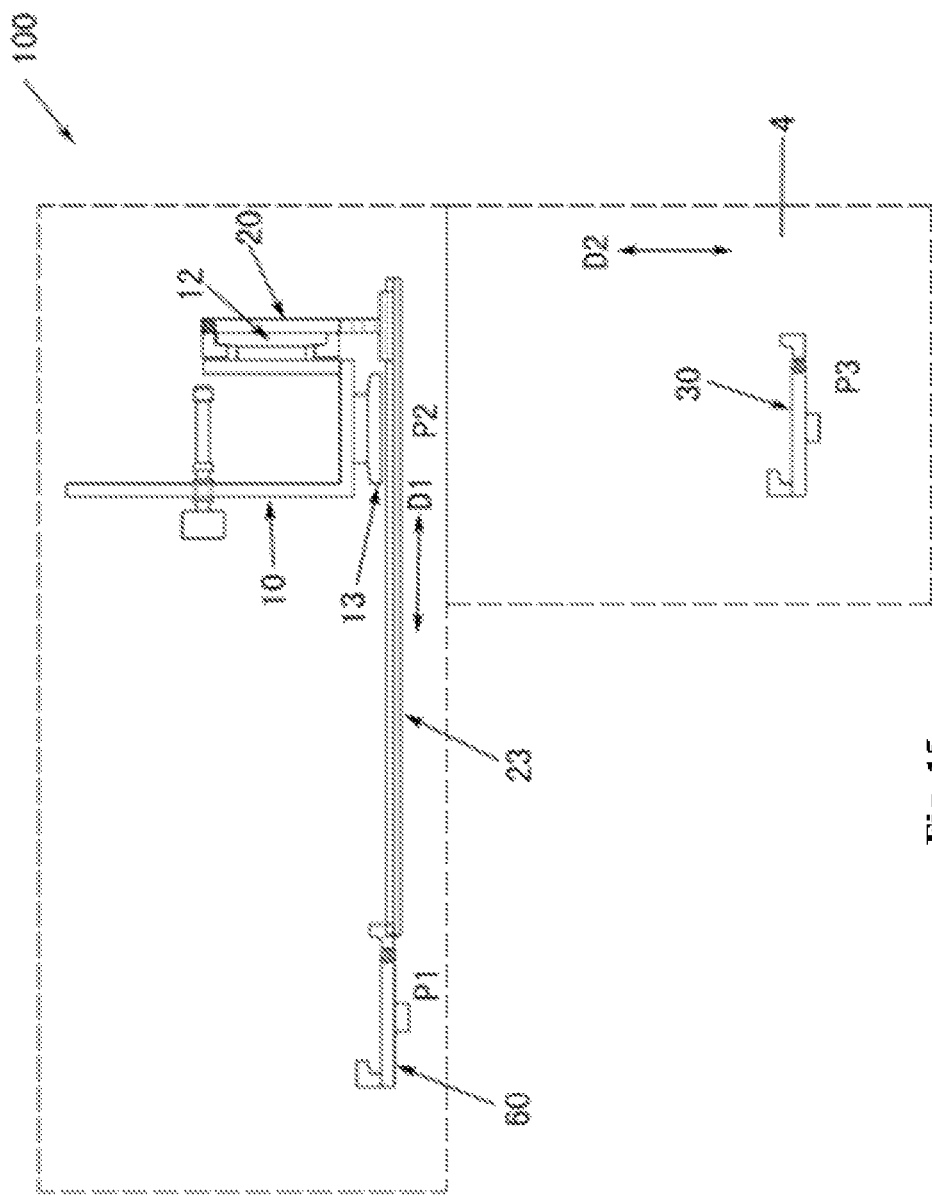
FIG. 15 illustrates a schematic view of the film peeling machine being moved to a second position by the first moving device according to one exemplary embodiment of the disclosure.
Figure 16:
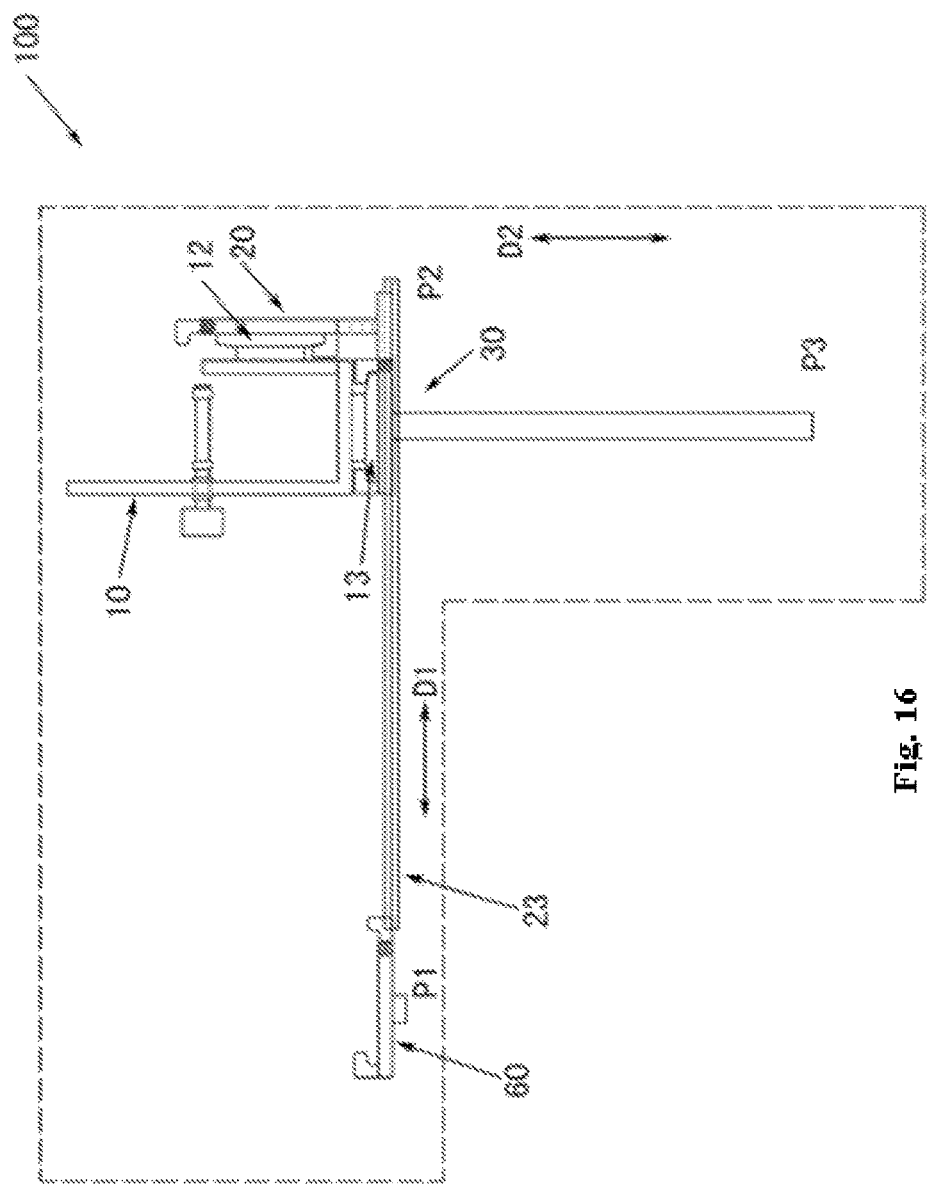
FIG. 16 illustrates a schematic view of the film peeling machine which is already engaged with a second side engaging component and begins to separate from a first side engaging component, at the second position, according to one exemplary embodiment of the disclosure.
Figure 17:
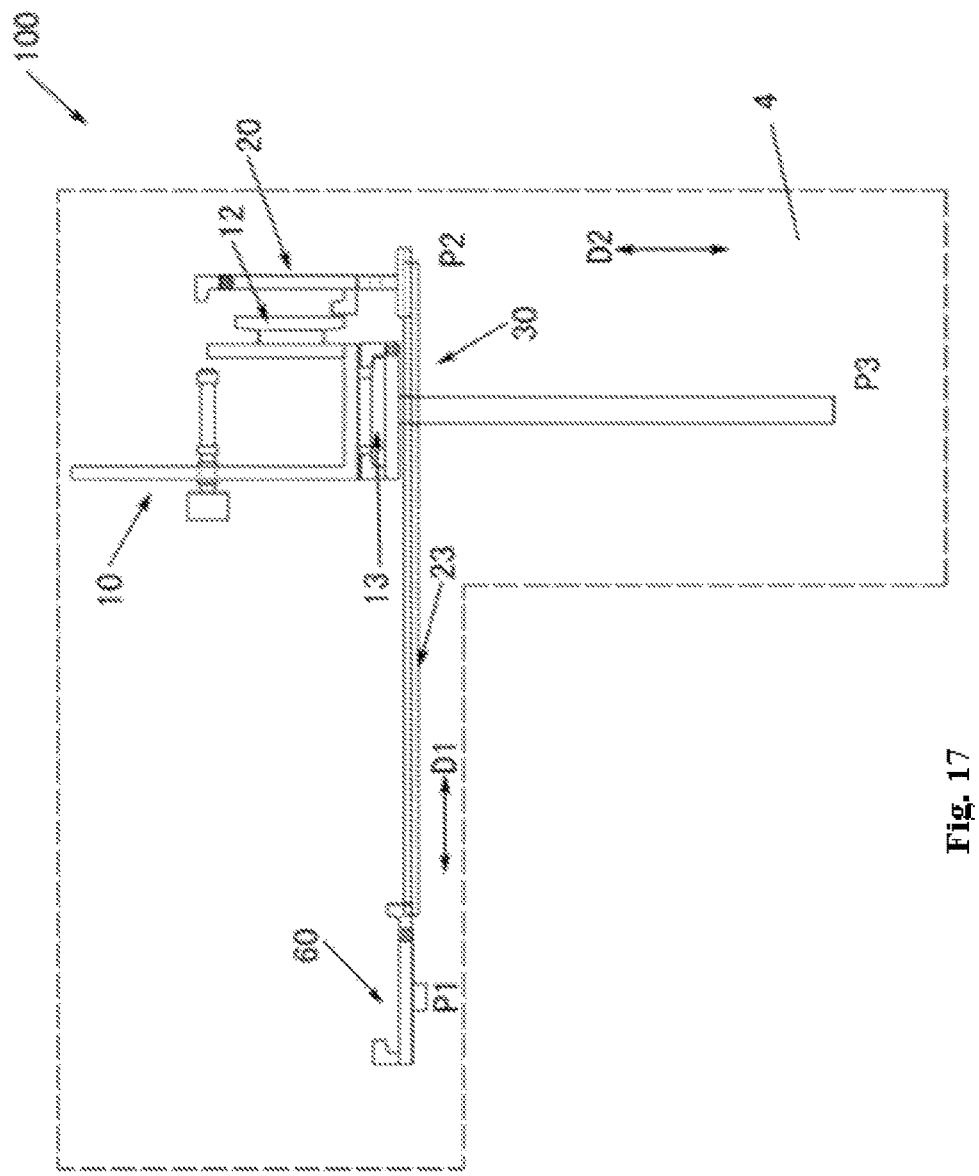
FIG. 17 illustrates a schematic view of the film peeling machine once it is already engaged with the second side engaging component and separated from the first side engaging component, at the second position, according to one exemplary embodiment of the disclosure.
Figure 18:
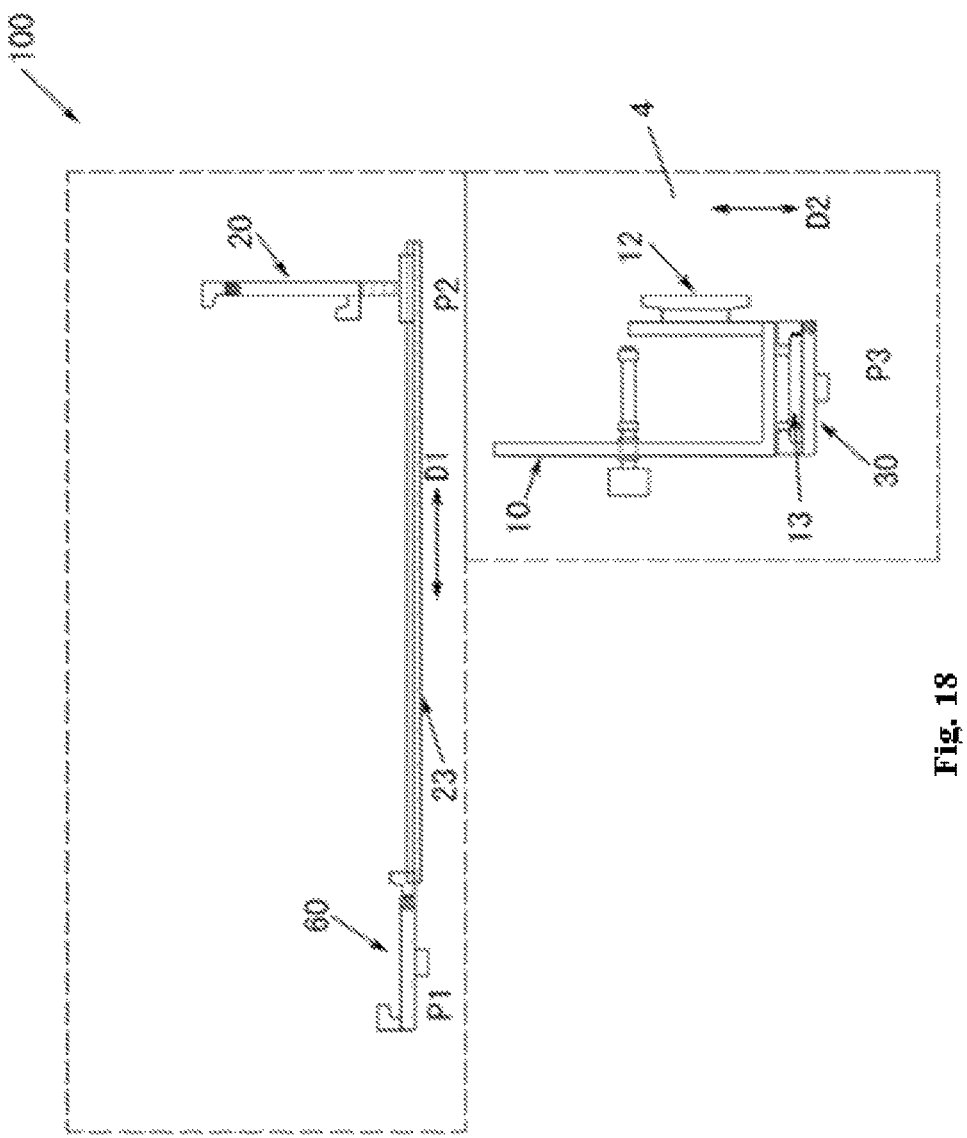
FIG. 18 illustrates a schematic view of the film peeling machine moving to a third position by a second moving device according to one exemplary embodiment of the disclosure.

By way of example, as illustrated in FIG. 13, upon replacement of the bearing disk for the film peeling tape of the film peeling machine 10, the film peeling machine 10 is moved from an operational position to the first position P1 by the engagement between the engaging component of a moving device 60 (e.g., the moving device 60 has a same structure as that of the second moving device 30) and the second engaging component 13 and by the moving component of the moving device 60; and then, as illustrated in FIG. 14, the film peeling machine 10 is further moved to the first moving device 20. As illustrated in FIG. 15, the film peeling machine 10 is moved to the second position P2 by the first moving device 20. Next, a door of the replacement chamber 4 is opened, as illustrated in FIGS. 16 and 17, the film peeling machine 10 is transferred to the second moving device 30 at the second position P2, followed by the movement of the film peeling machine 10 to a third position P3 by the second moving device 30 as illustrated in FIG. 18, i.e., being moved into the replacement chamber 4. The replacement may be carried out once the door of the replacement chamber 4 is closed.

The film peeling machine movement assembly 100 of the embodiments of the disclosure is applied, so as to implement automatic replacement of the bearing disk for the film peeling tape and to facilitate maintenance of the assembly.

Even though one or more moving devices are depicted in above exemplary embodiments, specific number and position of the moving devices may be chosen based on actual requirements. Furthermore, the first moving device and the second moving device in the claims do not necessarily correspond to the first and the second moving devices as depicted in the description; in other words, the first moving device and the second moving device in the claims may not be limited to the first and the second moving devices in the description.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present invention exemplarily, and should not be deemed as a restriction thereof.

Although several exemplary embodiments of the general concept of the present invention have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A film peeling machine movement assembly, comprising:
   a film peeling machine provided with a frame having a first portion and a second portion;
   first engaging components connected with one of the first portion and the second portion of the frame; and
   a first moving device provided with a first moving component and first side engaging components connected with the first moving component for engagement with a corresponding one of the first engaging components for moving the film peeling machine along a first path by the first moving component
   wherein a first H-shaped sub-assembly is created by the first engaging component and the one of the first portion and the second portion of the frame connected therewith, being formed with two first grooves which are arranged opposite to each other; and
   wherein the first side engaging component is provided with a first body and two first jaws arranged opposite to each other and connected with the first body, both of the two first jaws being engageable within the two first grooves respectively while at least one thereof being movable.

2. The film peeling machine movement assembly according to claim 1, further comprising:
   a second engaging component connected with the other one of the first portion and the second portion of the frame; and
   a second moving device provided with a second moving component and second side engaging components connected with the second moving component for engagement with the second engaging component for moving the film peeling machine along a second path by the second moving component.

3. The film peeling machine movement assembly according to claim 2, wherein the second engaging component is connected with a bottom portion of the frame, and
   wherein the second path is a path which is arranged substantially in a direction transverse to the first path.

4. The film peeling machine movement assembly according to claim 3, wherein the first engaging component is connected with a side portion of the frame, and
   wherein the first path is a path which is arranged substantially in a horizontal direction and the second path is arranged substantially in a vertical direction.

5. The film peeling machine movement assembly according to claim 2, wherein a first H-shaped sub-assembly is created by the first engaging component and the
one of the first portion and the second portion of the frame connected therewith, being formed with two first grooves which are arranged opposite to each other;
wherein the first side engaging component is provided with a first body and two first jaws arranged opposite to each other and connected with the first body, both of the two first jaws being engageable within the two first grooves respectively while at least one thereof being movable;
wherein a second H-shaped sub-assembly is created by the second engaging component and the other one of the first portion and the second portion of the frame connected therewith, being formed with two second grooves which are arranged opposite to each other; and
wherein the second side engaging component is provided with a second body and two second jaws arranged opposite to each other and connected with the second body, both of the two second jaws being engageable within the two second grooves respectively while at least one thereof being movable.

6. The film peeling machine movement assembly according to claim 5, wherein at least one of the two first jaws is rotatable or translatable; and
wherein at least one of the two second jaws is rotatable or translatable.

7. The film peeling machine movement assembly according to claim 5, wherein the second jaws are substantially in a form of inverted L shape.

8. The film peeling machine movement assembly according to claim 5, wherein the first engaging component comprises a first T-shaped piece which creates the first H-shaped sub-assembly with the one of the first portion and the second portion of the frame; and
wherein the second engaging component comprises a second T-shaped piece which creates the second H-shaped sub-assembly with the other one of the first portion and the second portion of the frame.

9. The film peeling machine movement assembly according to claim 5, wherein the two first grooves extend substantially horizontally in a lengthwise direction of the frame and are disposed substantially within a vertical plane respectively; and
wherein the two second grooves extend substantially horizontally in a direction transverse to the lengthwise direction of the frame and are disposed substantially within a horizontal plane respectively.

10. The film peeling machine movement assembly according to claim 1, wherein the first engaging component is connected with a side portion of the frame, and
wherein the first path is a path which is arranged substantially in a horizontal direction.

11. The film peeling machine movement assembly according to claim 1, wherein at least one of the two first jaws is rotatable or translatable.

12. The film peeling machine movement assembly according to claim 1, wherein the first jaws are substantially in a form of inverted L shape.

13. The film peeling machine movement assembly according to claim 1, wherein the first engaging component comprises a first T-shaped piece which creates the first H-shaped sub-assembly with the one of the first portion and the second portion of the frame.

14. The film peeling machine movement assembly according to claim 1, wherein the first portion and the second portion are a bottom portion and a side portion of the frame respectively.

15. The film peeling machine movement assembly according to claim 14, wherein the frame comprises:
a bottom wall defining the bottom portion;
a first side wall extending upwards from one side of the bottom wall, onto which first side wall a bearing disk for a film peeling tape is mounted via a drive shaft; and
a second side wall extending upwards from the other side of the bottom wall and defining the side portion.

16. The film peeling machine movement assembly according to claim 1, wherein one of the first portion and the second is arranged vertically while the other one of the first portion and the second portion is arranged horizontally.

17. The film peeling machine movement assembly according to claim 1, wherein the two first grooves extend substantially horizontally in a lengthwise direction of the frame and are disposed substantially within a vertical plane respectively.

* * * * *